(No Model.)
G. L. HINDERER.
BAKE PAN.
No. 334,662. Patented Jan. 19, 1886.
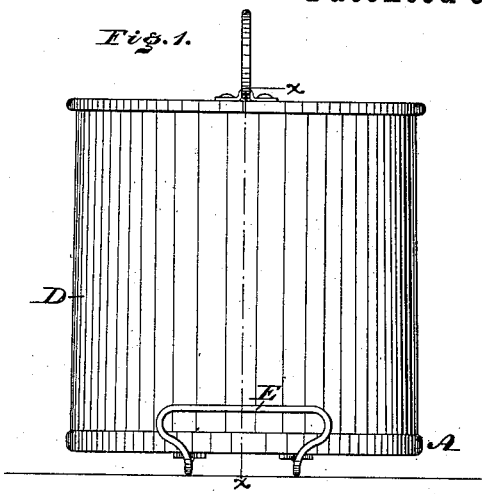
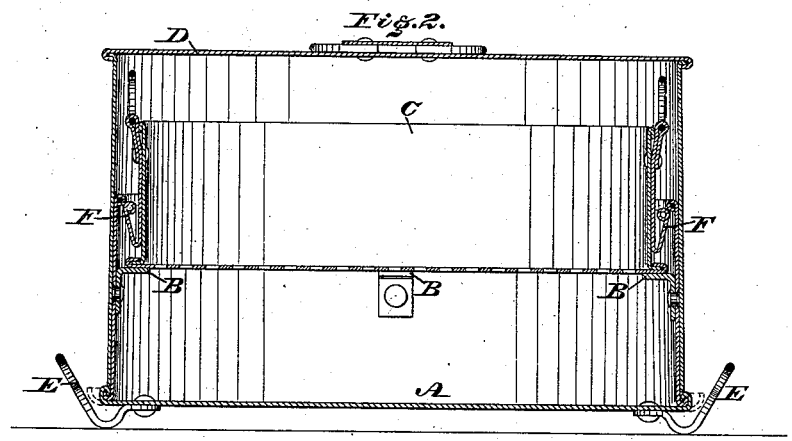
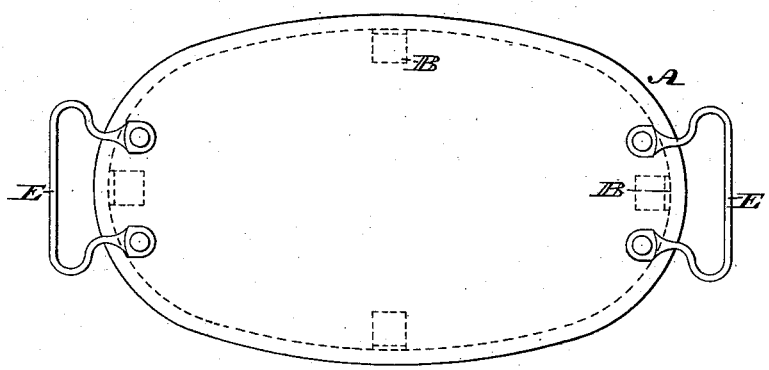
WITNESSES:
Th. Rolle.
W. F. Kircher
INVENTOR:
G. L. Hinderer
BY John A. Wiedersheim
ATTORNEY.

UNITED STATES PATENT OFFICE.

GUSTAV L. HINDERER, OF PHILADELPHIA, PENNSYLVANIA, ASSIGNOR O: ONE-HALF TO CHARLES KAUFMANN, OF SAME PLACE.

BAKE-PAN.

SPECIFICATION forming part of Letters Patent No. 334,662, dated January 19, 1886.

Application filed April 11, 1885. Serial No. 161,913. (No model.)

*To all whom it may concern:*

Be it known that I, GUSTAV L. HINDERER, a subject of the Emperor of Germany, residing in the city and county of Philadelphia, State of Pennsylvania, have invented a new and useful Improvement in Bake-Pans, which improvement is fully set forth in the following specification and accompanying drawings, in which—

Figure 1 represents a side elevation of a bake-pan embodying my invention. Fig. 2 represents a vertical section thereof in line $x$ $x$, Fig. 3. Fig. 3 represents a bottom plan view thereof.

Similar letters of reference indicate corresponding parts in the several figures.

My invention consists of a bake-pan having feet and handles of novel construction, and, furthermore, of means for preventing lateral and vertical motions of the inner vessel, all as will be hereinafter described.

It also consists of the construction of the handles of the pan, whereby they form the supporting-feet.

Referring to the drawings, A represents a bake-pan, within which are ledges B, for the support of a vessel, C, whose bottom is perforated.

D represents a cover, which is adapted to inclose the vessel C and envelop the sides of the pan A.

E represents the handles of the pan, the same being secured to the bottom thereof, whereby their ends form the feet of the pan, the pan thus resting on said feet and being thereby elevated when in use from the floor of the oven or plate of the stove, so that the burning of the contents of the pan is prevented.

It will be seen that when the pan is to be used the article of food is placed in the vessel C. According to well-known rules of cookery, the article may be roasted, baked, cooked, or steamed, the bottom pan readily holding water and receiving the drippings, and the cove confining the heat and vapors, so that there i no material loss of these important element during the use of the pan.

The handles E, besides serving or acting a feet, are so located that they will not inter fere with the application and removal of th cover to and from the pan, and the cover ma; be fitted approximately to the bottom of th pan, where a ledge or gutter may be provide to catch any escaping drip or moisture at th bottom of the cover.

F represents springs secured to the oute face of the vessel C, adapted to press agains the pan A, for preventing lateral motion o: displacement of said vessel, and also prevent ing the same from being raised during the op eration of removing the cover.

Having thus described my invention, what ] claim as new, and desire to secure by Letter Patent, is—

1. A bake-pan having feet formed of angular pieces secured at one end thereof to the bottom of said pan, a portion of each of the said angular pieces extending upward alongside but not in contact with the pan, forming handles therefor, in combination with a cover having sides reaching to the bottom of the pan, substantially as and for the purpose set forth.

2. A bake-pan having an interior bead at the side thereof and a ledge on the inner side, and provided with an inner vessel with a perforated bottom, resting on said ledge, the outer side of said inner vessel having spring-catches attached thereto, adapted to bear against the side and to engage the bead of said pan, all of said parts being arranged and combined for preventing accidental lateral motion of the inner vessel and vertical displacement of the same, substantially as described.

GUSTAV L. HINDERER.

Witnesses:
JOHN A. WIEDERSHEIM,
A. P. GRANT.